United States Patent
Yegin

(10) Patent No.: US 7,376,097 B2
(45) Date of Patent: May 20, 2008

(54) METHOD OF ASSOCIATING AN IP ADDRESS WITH A PLURALITY OF LINK LAYER ADDRESSES IN A WIRELESS COMMUNICATION NETWORK

(75) Inventor: Alper E. Yegin, Foster City, CA (US)

(73) Assignee: NTT DoCoMo Inc., Tokyo (JP)

( * ) Notice: Subject to any disclaimer, the term of this patent is extended or adjusted under 35 U.S.C. 154(b) by 1013 days.

(21) Appl. No.: 10/370,957

(22) Filed: Feb. 19, 2003

(65) Prior Publication Data

US 2004/0100922 A1    May 27, 2004

(51) Int. Cl.
  *H04Q 7/00*  (2006.01)
  *H04Q 7/24*  (2006.01)
(52) U.S. Cl. .................... 370/328; 370/331; 370/338
(58) Field of Classification Search .............. None
  See application file for complete search history.

(56) References Cited

U.S. PATENT DOCUMENTS

| | | | | |
|---|---|---|---|---|
| 6,097,733 | A * | 8/2000 | Basu et al. | 370/468 |
| 6,115,615 | A * | 9/2000 | Ota et al. | 455/422.1 |
| 6,577,644 | B1 * | 6/2003 | Chuah et al. | 370/466 |
| 6,747,964 | B1 * | 6/2004 | Bender | 370/335 |
| 2003/0035438 | A1 * | 2/2003 | Larsson | 370/466 |
| 2003/0223450 | A1 * | 12/2003 | Bender et al. | 370/441 |

FOREIGN PATENT DOCUMENTS

WO    WO 01/56190    *  8/2001

OTHER PUBLICATIONS

Jacquet F.striping scheme for wireless communication systems, 2000, IEEE, pp. 520-525.*
Jacquet F. striping over wireless link : effects on transmission delays, 2000, IEEE, pp. 1358-1362.*
Jacquet F. a method for increasing throughput based on packet striping, 2000, IEEE, pp. 375-379.*
Snoeren Alex. Adaptive inverse multiplex ing for wide area wireless networs, 1999, Globe,pp. 1665-1672.*
"RFC2461—Neighbor Discovery for IP Version 6 (IPv6)", The Internet Society, 1998.

* cited by examiner

*Primary Examiner*—Steven Nguyen
(74) *Attorney, Agent, or Firm*—Edward C. Kwok; McPherson Kwok Chen & Heid LLP

(57) ABSTRACT

This invention relates generally to a method of associating an IP address with a link layer address in a wireless communication network. The method comprises the steps of assigning an IP address to a plurality of link layer addresses; establishing a link layer connection with a first wireless network interface on the IP address; and establishing a link layer connection with a second wireless network interface on the IP address. The method of the present invention enables the increased downloading of data to a client device by aggregating data links associated with an IP address. The method also enables the bi-casting of data to a client device from an IP address associated with a plurality of link layer addresses of wireless communication device. Finally, the invention enables failure recovery by enabling downloading to a second link layer address if a communication link to a first link layer address deteriorates.

4 Claims, 2 Drawing Sheets

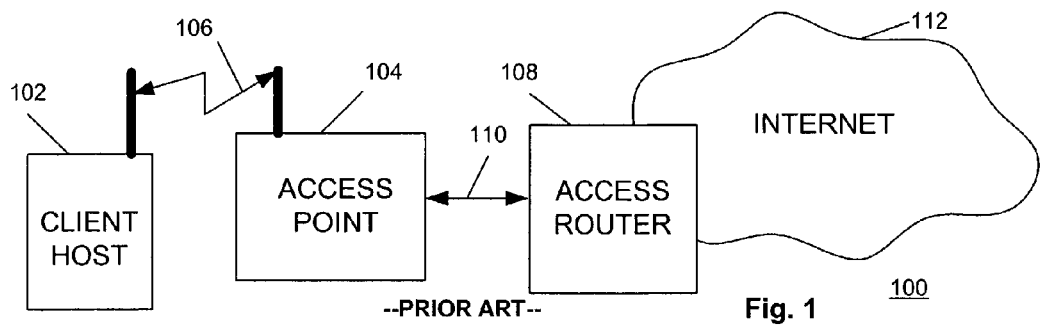
--PRIOR ART--  Fig. 1
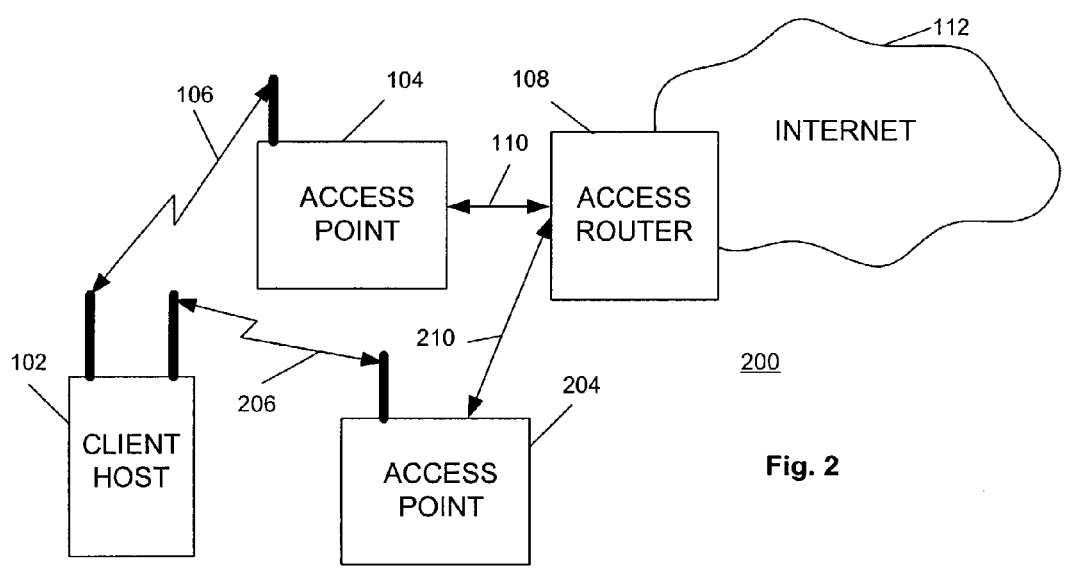
Fig. 2
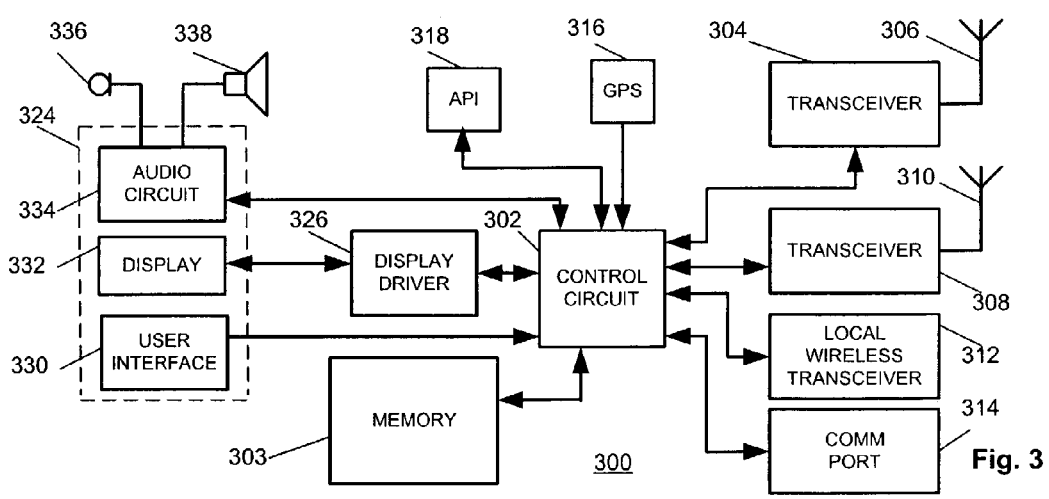
Fig. 3

METHOD OF ASSOCIATING AN IP ADDRESS WITH A PLURALITY OF LINK LAYER ADDRESSES IN A WIRELESS COMMUNICATION NETWORK

FIELD OF THE INVENTION

This invention relates generally to wireless communication devices and networks, and in particular, to a method of associating an IP address with a link layer address in a wireless communication network.

BACKGROUND OF THE INVENTION

Access points and access routers are the basic building blocks of wireless access networks. Access points (AP) provide a radio interface to a network by bridging wired segments to wireless segments. The access router (AR) behind the AP provides gateway functionality for the internet protocol (IP) network. Client hosts establish radio links with an AP to communicate with the AR and access the IP network.

In order to connect to the Internet, a client device first has to discover access points in its neighborhood. It might have to do this when it first starts, or when it loses its current network connection due to deteriorating radio conditions. The client device can perform access point discovery by scanning different radio channels. Since there may or may not be any access point on a given channel, this process is usually executed in an exhaustive manner. Depending on the availability of access points and their responsiveness, this process of identifying a next access point can take up to several hundreds of milliseconds with IEEE 802.11b technology, for example.

Once an access point is discovered, the client now has to establish link-layer connectivity with this access point in order to be able to exchange IP packets with the access router. Unless this is an open system (i.e., free network access), this stage involves authentication and authorization of the client. Authentication process usually requires several over-the-air messages accompanied with others over the wired backbone for the access point communicating with the authentication backend server. Because the latter usually involves messaging across the Internet, it is a very costly operation. A successful authentication process can take up to a few seconds to complete.

Once the client has link-layer connectivity, it can proceed to discovering the access router(s) on this link and configure its IP address and default gateway. Depending on the choice of address configuration (e.g., via PPP, DHCP, IPv6 stateless address auto-configuration), this stage can take between tens of milliseconds and a couple of seconds.

Depending on the needs of the client, there can be more stages of discovery, such as, discovering a DNS server, localized mobility management server, IPv4-lPv6 translators or application layer gateways. Any of these operations would have to wait for successful completion of the earlier stages, and therefore cannot be executed in parallel.

When a client desires to get connected to the Internet via an access network, it has to follow a number of stages before it can successfully do so. Going through this complete connection process usually takes on the order of few seconds, during which the client has no IP connection. While being disruptive to any kind of communication, this type of latency is especially unacceptable for delay-sensitive real-time applications, such as voice over IP (VoIP).

The problem becomes magnified when there are several access networks with varying capabilities in the same geography. This type of heterogeneity would exist with WLAN deployments. Each access point might be owned by a different service provider that may or may not allow a particular client in their network. Even after a client has established link-layer connectivity with one of the access points, it might discover that the access router doesn't provide a certain required functionality (e.g., no IPv6 support), or the network is lacking a desired server/service (e.g., SLP). In this case, even though the client has already spent its valuable time trying to use a particular access network, now it might have to start from the beginning and look for another access point. This process also needs to be repeated each time the client has to perform a handover.

The relation between link-layer addresses and IP addresses is characterized as "one-to-many" in conventional networks. That is, a link-layer address can be used with multiple IP addresses on the same host. But a single IP address can only be mapped to one link-layer address. IPv6 Neighbor Discovery [NDISC] protocol is designed in accordance with this model. A neighbor advertisement can provide only one link-layer address for the given target address.

Wireless Internet access is generally unreliable compared to its wired counterpart. A wireless host can experience varying levels of packet loss and connection loss. During the course of a communication, it may change its point of attachment several times due to mobility.

Accordingly, there is a need for a method of associating an IP address with a plurality of link layer addresses in a wireless communication network.

SUMMARY OF THE INVENTION

This invention relates generally to a method of associating an IP address with a link layer address in a wireless communication network. The method comprises the steps of assigning an IP address to a plurality of link layer addresses; establishing a link layer connection with a first wireless network interface on the IP address; and establishing a link layer connection with a second wireless network interface on the IP address. The method of the present invention enables the increased downloading of data to a client device by aggregating data links associated with an IP address. The method also enables the bi-casting of data to a client device from an IP address associated with a plurality of link layer addresses of wireless communication device. Finally, the invention enables failure recovery by enabling downloading to a second link layer address if a communication link to a first link layer address deteriorates.

BRIEF DESCRIPTION OF THE DRAWINGS

FIG. 1 is a block diagram of a conventional wireless communication network;

FIG. 2 is a block diagram of system incorporating a method and apparatus according to the present invention;

FIG. 3 is a block diagram of a client device according to the present invention;

DETAILED DESCRIPTION OF THE DRAWINGS

Figure 4:
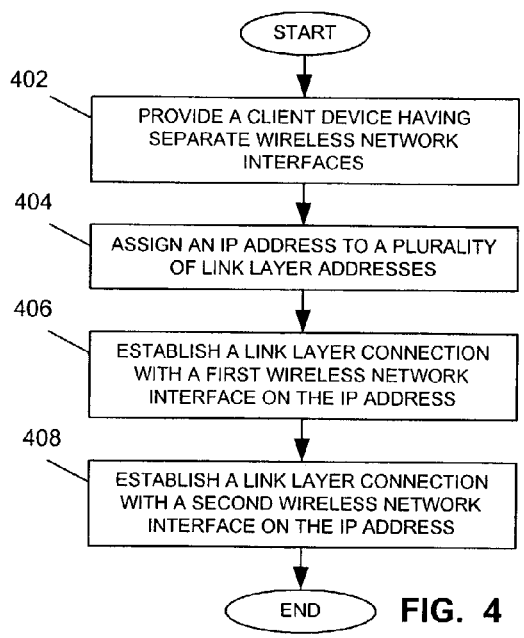
FIG. 4 is a flowchart showing a method of establishing an IP address with a plurality of link layer addresses according to the present invention.

Turning now to FIG. 1, a block diagram of a conventional wireless communication network is shown. A client host 102 is coupled to an access point 104 by a wireless communication link 106. The access point 104 is coupled to an access router 108 by a communication link 110. The access router 108 is coupled to a communication network, such as the Internet 112.

Turning now to FIG. 2, a block diagram of system incorporating a method and apparatus according to the present invention is shown. In particular, a client device 202 having multiple communication interfaces, in addition to communicating with access point 104, can communicate with a second access point, such as access point 204 by way of a wireless communication link 206. The second access point 204 could also communicate with access router 108 by way of a communication link 210. The client device 202 having multiple network communication interfaces can both send and receive data on one network interface, while determining the availability and compatibility of a second access point and possibly access router.

The client device 202 enables the access network discovery process could be carried out in parallel with exchanging data traffic. Client devices that have only one transceiver unit can do either data exchange or discovery at a time, but not both. Interleaving these two operations jeopardizes the performance of both and therefore is impractical. These problems can be solved by using dual-transceivers on the client device of the present invention.

A client device can either have two separate wireless network interfaces (e.g. two separate transceivers), or have one interface that has two transceivers (e.g. a single network card having two transceivers). In either case, the client device is able to establish link-layer and network-layer connectivity using both units simultaneously. While one interface is used for sending and receiving data traffic, the other can be used for discovering other access networks.

The client device can either activate a discovery transceiver only when it detects the current radio link with a data transceiver is deteriorating and a link-layer handover is anticipated, or keep it in discovery stage all the time. The former choice has better battery consumption where the discovery transceiver can run in power-saving mode until it is needed. The latter choice constantly keeps track of candidate APs in the vicinity and therefore reacts to requests even faster.

Turning now to FIG. 3, a block diagram of a client device 102 according to the present invention is shown. The device preferably includes a control circuit 302, such as a microprocessor, microcontroller, ASIC or some other circuit or integrated circuit to control the device. A memory device 303 could also be coupled to the control circuit. The control circuitry 302 is also coupled to a first transceiver 304 having an antenna 306, and a second transceiver 308 have an antenna 310. The client device could also include a local wireless transceiver 312 for enabling low-power communications, such as infrared, Bluetooth, IEEE 802.11, etc. The client device can also include a communication port 314 for enabling wired communications such as RS-232 communication. The client device also preferably includes a GPS unit 316 enabling the reception of GPS signals. The control circuit 302 is also coupled to a user interface section 324 which preferably comprises a user interface 330, a display 332, audio circuitry 334 having a microphone to 336 and/or a speaker 338. The client device could be any type of wireless communication device, such as a wireless PDA or cellular telephone.

Turning now to FIG. 4, a flowchart shows a method of establishing an IP address with a plurality of link layer addresses according to the present invention. In particular, a client device having separate wireless network interfaces is provided a step 402. An IP address is assigned to a plurality of link layer addresses at a step 404. A link layer connection is established with a first wireless network interface having a first link layer address using the IP address at a step 406. A second link layer connection is provided with a second wireless network interface having a second link layer address using the IP address at a step 408. As will become more apparent in reference to the remaining figures, by assigning an IP address to multiple link layer addresses, the client device is provided with better service on the wireless communication network.

Figure 5:
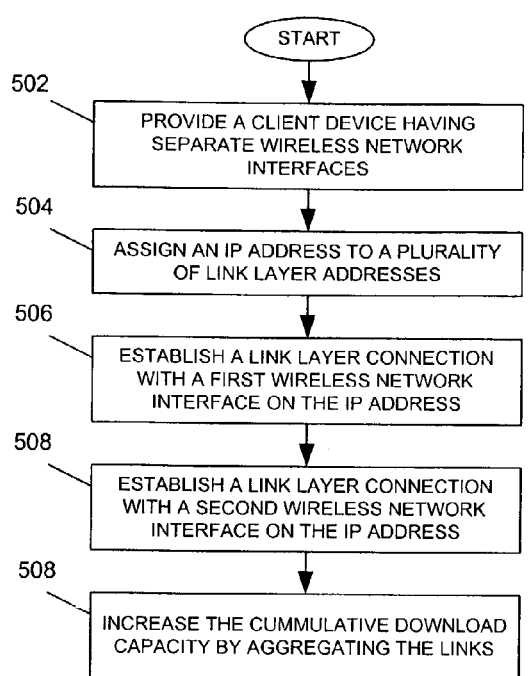
FIG. 5 is a more detailed flowchart showing a method of increasing the download capacity by aggregating links associated with an IP address according to the present invention.

Turning out to FIG. 5, a flowchart shows a method of increasing the download capacity by aggregating links associated with an IP address according to the present invention. This method would increase the cumulative downlink bandwidth capacity for the client device when each interface is associated with a different access point. The client device can verify its link-layer associations to confirm that each interface is connected to a different access point. Furthermore, it can also verify that they are still connected to the same access routers and therefore same IP subnet.

The client device can send an extended neighbor advertisement with multiple link-layer addresses to the router. Additionally, it can include a Weight Vector option to indicate weighted distribution of outgoing packets on the router. The router preferably would create a neighbor cache entry that contains multiple link-layer addresses, and schedule packets sent to different link-layer addresses based on the relative weights. The client device can turn this feature off by sending a regular neighbor advertisement that includes single link-layer address.

Referring specifically to FIG. 5, a client device having separate wireless network interfaces is provided a step 502. An IP address is assigned to a plurality of link layer addresses at a step 504. A link layer connection is established with a first wireless network interface having a first link layer address using the IP address at a step 506. A second link layer connection is provided with a second wireless network interface having a second link layer address using the IP address at a step 508. The cumulative download capacity to the client device is then increased by aggregating the links at a step 510. That is, different information can be sent to each link, and therefore increase the total information sent to the client device.

Figure 6:
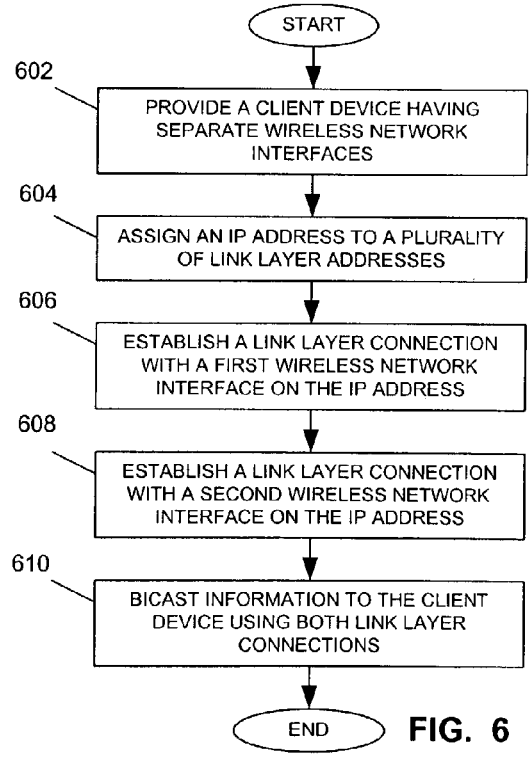
FIG. 6 is a flowchart showing a method of bi-casting information using a plurality of link layer connections associated with an IP address according to the present invention.

Turning now to FIG. 6, a flowchart shows a method of bi-casting information using a plurality of link layer connections associated with an IP address according to the present invention. Reliability of the network can be significantly reduced before and after a link-layer handover. A client device might desire to use its multiple network interfaces to compensate for the instability associated with a handover. The client device might request bi-casting of its incoming traffic sufficiently before the handover. Bi-casting would effectively result in router duplicating incoming packets and transmitting one copy to each link-layer destination. So, if one of the network interfaces is not able to receive the packet, hopefully some other will receive it. The client device can stop bi-casting as soon as it determines the network conditions are stable. Weight Vector option could also be employed according to the present invention. Bi-casting would not preferably be used for extended period of times, as it creates additional load on the router and the network.

Referring specifically to FIG. 6, a client device having separate wireless network interfaces is provided a step 602. An IP address is assigned to a plurality of link layer addresses at a step 604. A link layer connection is established with a first wireless network interface having a first link layer address using the IP address at a step 606. A second link layer connection is provided with a second wireless network interface having a second link layer address using the IP address at a step 608. Information is then bi-cast to the client device on both link layer connections at a step 610. Bi-casting on both link layers can avoid losing data if one communication link degrades.

Figure 7:
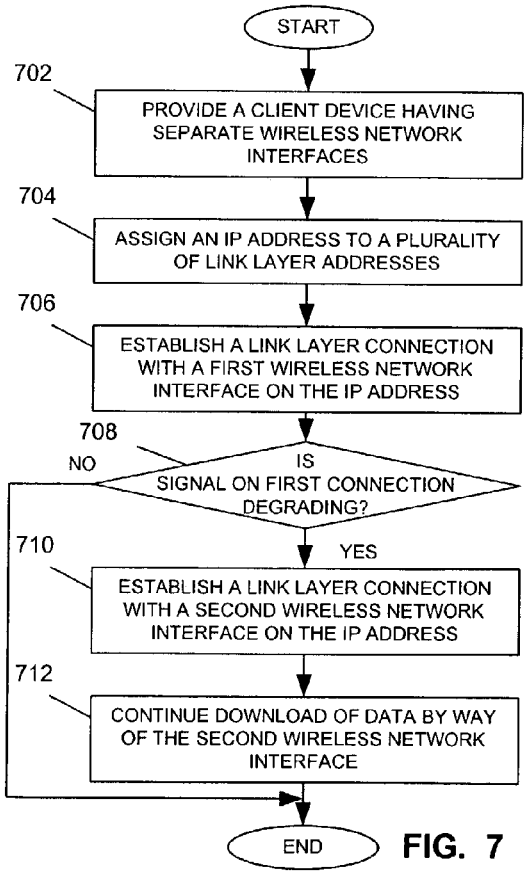
FIG. 7 is a flowchart showing a method of maintain a communication link by downloading to a second link layer connections associated with the client device using an IP address according to the present invention.

Turning now to FIG. 7, a flowchart shows a method of maintain a communication link by downloading to a second link layer connections associated with the client device using the IP address according to the present invention. Even if a client device is not actively using multiple interfaces at the same time, it might want to keep backup interfaces in case connectivity of the primary one is severed. The client device can indicate backup link-layer addresses by associating a weight of 0 with them. If the router detects that the primary interface is no longer associated with the network, it can activate the secondary link-layer for the same address. This functionality can be used as long as the client device has backup interfaces associated with the same IP subnet.

Referring specifically to FIG. 7, a client device having separate wireless network interfaces is provided a step 702. An IP address is assigned to a plurality of link layer addresses at a step 704. A link layer connection is established with a first wireless network interface having a first link layer address using the IP address at a step 706. It is then determined whether a signal on a first connection is degrading at a step 708. If so, A second link layer connection is then established with a second wireless network interface having a second link layer address using the IP address at a step 710. Data would then be downloaded to the client device by way of the second wireless network interface at a step 712.

A client device that is configured with a dual network interface can send and receive data packets on both interfaces at the same time. This capability can be utilized to make up for the unreliable nature of the wireless network. The capabilities that can be enabled using dual network interfaces of the present invention include link-aggregation for increased bandwidth, bi-casting for reliable transmission especially during handovers, and failure recovery using a backup network interface. In order to achieve these goals with minimum impact on the upper layers (e.g., TCP, UDP, applications) and reliance on external entities, the solution is preferably confined within the IP module of first hop routers and hosts.

This protocol extends neighbor discovery to handle many-to-many mapping between link-layer addresses and IPv6 addresses. A neighbor advertisement can provide more than one link-layer address for a given target IPv6 address. Additional information in the neighbor advertisement also specifies how each of these link-layer addresses can be used. For example, packets can be forwarded to each destination in a weighted round-robin fashion, or forwarded to both destinations simultaneously, or forwarded to backup destination only when the router gets notification that the primary is disconnected. This protocol does not effect how outgoing packets are transmitted. Client devices can use a scheduling method of its own for packet transmission.

A new bit-flag is defined according to the present invention for router advertisement messages to indicate that this router can process extended neighbor advertisement messages.

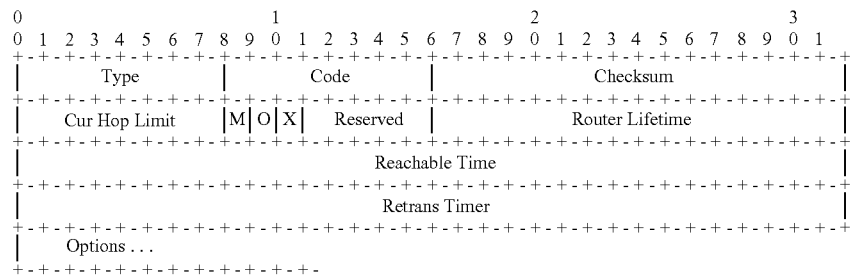

A new ICMP bit field defines 1-bit multi-link capable flag, shown as X for example. When set, it indicates the sender router can support multiple link-layer addresses for IP addresses. This flag preferably indicates that it can support various methods of aggregating links, bicasting, providing back-up links, etc. as defined in this specification.

The format of the neighbor advertisement message is same as defined in NDISC. A host using this protocol can include multiple Target Link-layer Address options. Such an advertisement would also preferably include Weight Vector option, which indicates how each address will be used. In the absence of this option, all of the link-layer addresses except the first one would preferably be discarded.

A Weight Vector opinion is preferably included in the neighbor advertisements that include multiple link-layer addresses. The values provided in this option are used for interpreting how each address should be used by the receiver.

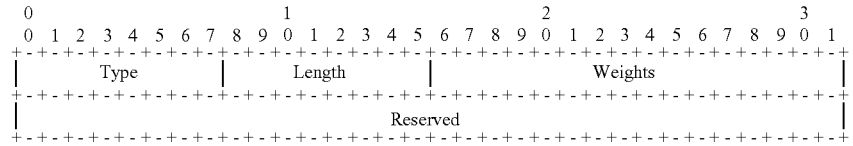

FIELDS

| | |
|---|---|
| Type | TBD |
| Length | 1 |
| Weights | Array of 16 1-byte values. Each value is assigned to the link-layer address provided as specified in the same order. Any unused value must be set to zero and must be ignored by the receiver. |
| Reserved | This field is unused. It must be initialized to zero by the sender and must be ignored by the receiver. |

If any of the weights is less than 255, this preferably indicates host is requesting link-aggregation. In that case, cumulative weights for all of the link-layer addresses should be exactly 255, for example. Otherwise extensions should be ignored and the first link-layer address is used as specified in NDISC. In this mode, none of the weights matching a specific link-layer address is allowed to be 0.

If the first weight is 255, the rest of the weights should be either all 255 or all 0. All 255 preferably indicates that the client device is requesting bi-casting. A 255 followed by 0 s preferably indicates that the client device is specifying the subsequent link-layer addresses as for its backup interfaces.

It is contemplated that various usage models (e.g., using a subset of interfaces for bi-casting, while another set is used with link-aggregation, and the rest is saved as a backup) could be established.

Bi-casting can result in duplication of the received packets. Link-aggregation can result in out-of-order delivery. Internet applications should generally be prepared for this type of behavior, as IP datagram delivery is unreliable. Nevertheless, systematic introduction of these traffic behaviors should preferably be minimized. This goal can be achieved by introducing sequencing the transmitted packets on the sender, and re-ordering packets and eliminating duplicates on the receiver.

It can therefore be appreciated that the new and novel method and system for associating an IP address with a plurality of link layer addresses in a wireless communication network has been described. It will be appreciated by those skilled in the art that, given the teaching herein, numerous alternatives and equivalents will be seen to exist which incorporate the disclosed invention. As a result, the invention is not to be limited by the foregoing embodiments, but only by the following claims.

The invention claimed is:

1. A method of associating an IP address with a plurality of link layer addresses in a wireless communication network, the method comprising the steps of:
    assigning an IP address to the link layer addresses;
    receiving from a router a neighbor advertisement message having a bit flag indicating that the router is capable of processing multiple link layer connections with a client device under the same IP address;
    responding to the router providing the link layer addresses and a weight vector indicating, for each link layer address, the weight vector to be assigned in a connection to be established using that link layer address;
    establishing a first link layer connection with the router using a first wireless network interface assigned to a first one of the link layer addresses on said IP address;
    establishing a second link layer connection with the router using a second wireless network interface assigned to a second one of the link layer addresses on said IP address; and
    communicating data through the router using the first and second link layer connections in accordance with the weight vector.

2. The method of claim 1, wherein the first and the second link layer connections support point-to-point connections with a second communication device and a third communication device, respectively.

3. The method of claim 1, wherein the first and the second link layer connections support a point-to-point connection with a second communication device.

4. The method of claim 3, wherein data communicated over the first and second link layer connections are aggregated.

* * * * *